United States Patent [19]

Smith

[11] Patent Number: 4,968,409

[45] Date of Patent: Nov. 6, 1990

[54] HYDROCARBON PROCESSING OF GAS CONTAINING FEED IN A COUNTERCURRENT MOVING CATALYST BED

[75] Inventor: David S. Smith, San Rafael, Calif.

[73] Assignee: Chevron Research Company, San Francisco, Calif.

[21] Appl. No.: 305,584

[22] Filed: Feb. 2, 1989

Related U.S. Application Data

[63] Continuation of Ser. No. 591,740, Mar. 21, 1984, abandoned.

[51] Int. Cl.$^5$ .............................................. C10B 31/02
[52] U.S. Cl. ..................................... 208/157; 208/164; 208/251 H; 422/213; 422/216
[58] Field of Search ................. 208/251 H, 15 A, 164; 422/213, 216

[56] References Cited

U.S. PATENT DOCUMENTS

| | | | |
|---|---|---|---|
| Re. 25,770 | 4/1965 | Johanson | 208/143 |
| ,524,731 | 8/1970 | Effron et al. | 208/146 |
| 2,379,734 | 7/1945 | Martin | 422/216 |
| 2,490,828 | 12/1949 | Newton | 422/216 |
| 2,596,610 | 5/1952 | Shabaku | 422/216 |
| 2,729,548 | 1/1956 | Forkel | 422/216 |
| 2,740,619 | 4/1956 | Lynch | 422/216 |
| 2,956,010 | 10/1960 | Buckner, Jr. | 208/166 |
| 2,987,465 | 6/1961 | Johanson | 208/146 |
| 3,146,184 | 8/1964 | Kunreuther et al. | 208/146 |
| 3,336,217 | 8/1967 | Meaux | 422/213 |
| 3,547,804 | 8/1968 | Ehrlich et al. | 208/143 |
| 3,785,963 | 1/1974 | Boyde et al. | 208/171 |
| 3,826,737 | 7/1974 | Pegels et al. | 208/143 |
| 3,849,295 | 11/1974 | Addision | 208/166 |
| 3,856,662 | 12/1974 | Greenwood | 208/171 |
| 3,870,623 | 3/1975 | Johnson et al. | 205/251 H |
| 3,882,015 | 5/1975 | Carson | 208/169 |
| 3,910,623 | 10/1975 | Anderson | 208/59 |
| 3,910,834 | 10/1975 | Anderson | 208/144 |
| 4,083,764 | 4/1978 | Hildebrand et al. | 208/413 |
| 4,111,663 | 9/1978 | Walk et al. | 208/409 |
| 4,187,164 | 2/1980 | Euzen et al. | 208/157 |
| 4,188,283 | 2/1980 | Czajkowski et al. | 208/143 |
| 4,217,206 | 8/1980 | Nongbi | 208/251 H |
| 4,571,326 | 2/1986 | Bischoff et al. | 422/207 |

FOREIGN PATENT DOCUMENTS

1177385   11/1984   Canada .......................... 208/251 H

*Primary Examiner*—Helane Myers
*Attorney, Agent, or Firm*—T. G. De Jonghe

[57] ABSTRACT

A uniform feed distribution system for selectively upgrading a feed stream of hydrocarbon fluid containing metallic components, such as organometallic compounds, and/or inert materials, which deactivate or contaminate catalyst particles counterflows into a descending bed of catalyst particles. The heated feed stream is at temperatures and pressures so that lighter hydrocarbon components or hydrogen evolve as gas components as it is introduced into the reaction vessel. The evolved gas is separated into reservoir or pocket above a reservoir of liquid components and both components are then uniformly and selectively introduced into the downflowing bed of catalyst. By forming a common supply volume of gaseous and liquid components, the gas components are independently accessible to the lower end of the moving bed of catalyst particles through an inclined distribution surface preferably in the form of a cone. The cone is supported in the lower portion of the vesel to form a catalyst collection bin for removal of spent catalyst from the bed. Gas distribution to the bottom of the inclined surface is through a plurality of holes formed at different elevations, but proportioned so that gas flow into the bed is substantially uniform, or a known pattern, independent of hole elevation or the elevation of liquid feed tubes through the inclined surface.

4 Claims, 1 Drawing Sheet

HYDROCARBON PROCESSING OF GAS CONTAINING FEED IN A COUNTERCURRENT MOVING CATALYST BED

This is a continuation of application Ser. No. 591,740, filed Mar. 21, 1984, now abandoned.

FIELD OF INVENTION

This invention relates to a method of upgrading a hydrocarbon process feed including gaseous components and liquid components flowing countercurrent to a moving bed of catalytic particles. More particularly, it relates to upgrading of hydrocarbons containing organo-metallic or metal components which contamimate catalyst and/or tend to produce Conradson carbon, such as tar sands, coal, shale, and the like, so that the catalyst must be supplied and removed on a continuous or intermittent basis to maintain catalytic conversion and contaminant removal from the hydrocarbon components of the feed.

OBJECT OF THE INVENTION

It is a particular object of the invention to provide a uniform feed distribution system for selectively upgrading a stream of hydrocarbon fluid containing metallic components, such as organometallic compounds, and/or inert materials, which deactivate or contaminate catalyst particles. Such uniform distribution of the hydrocarbon feed counterflows to a descending bed of catalyst particles as a heated stream at temperatures and pressures so that lighter hydrocarbon components or hydrogen evolve as gas components as it is introduced into the reaction vessel. In accordance with the invention, such evolved gaseous components are separated as a gas reservoir or pocket above a reservoir of liquid components. Both components are then uniformly and selectively introduced into the downflowing bed of catalyst. Uniform and selective distribution is obtained by forming a common supply volume of the gaseous and liquid components so that the gas components are independently accessable to the lower end of the moving bed of catalyst particles through an inclined distribution surface preferably in the form of a cone. The cone is supported in the lower portion of the vessel to form a catalyst collection bin to remove spent catalyst from the bed. Gas distribution to the bottom of the inclined surface is through a plurality of holes formed at different elevations, but proportioned in accordance with the invention so that gas flow into the bed is substantially uniform, independent of hole elevation or the elevation of liquid feed tubes interconnecting the common liquid reservoir to the catalyst bed through the inclined surface.

BACKGROUND OF THE INVENTION

Over the past few years the supply of high quality crude oils has diminished and the price of easily refined oils substantially increased. Frequently suppliers of high quality crudes require purchase of great volumes of less desirable crudes, such as those containing metal or organo-metallic contaminants, or heavier gravity crude oils. Further, treatment of crude oils manufactured as "synthetic" crudes from shale, coal, tar sands or other low gravity oils, require decontamination of the heavier and/or metal components and inert materials to produce a crude that can be easily processed in conventional hydroprocessing units available for refining high quality crudes. For example, among the synthetic crudes and tars, a common characteristic is their high end boiling points, high viscosity and high metals nitrogen and sulfur content. Some heavy petroleum crudes also contain nickel, vanadium and iron in sufficient quantities to foul and contaminate all downstream refining processes. While various arrangements for reacting such low quality crudes have been proposed including demetalization, desulfurization, hydrocracking, hydrogenating, and dehydrogenating, such processes have been basically conducted in fixed bed catalytic reactors. Such reactors require frequent regeneration to maintain the activity of the catalyst. An example of such a system for treating relatively low metal content crudes is shown in U.S. Pat. No. 3,826,737 Pegels, et al., issued July 30, 1974. The demetallation reactor disclosed is stated to be suitable for countercurrent or cocurrent flow of the catalyst and feed, although the patent is directed primarily to cocurrent operation. A system disclosing countercurrent operation is shown in U.S. Pat. No. 3,882,015, Carson, issued May 6, 1975. This patent discloses a unitary multistage reactor for countercurrently reacting a fluid stream with catalyst particles. However, the system is primarily for reactions involving light naphtha hydrocarbons rather than crude oils.

Reaction schemes and catalysts proposed for catalytic upgrading processes by demetallizing, desulferizing, hydrocracking, hydrogenating, or denitrogenating, typically involve treating residual oils that have contaminant levels relatively much lower than those of the heavy and synthetic crudes or tars discussed above. U.S. Pat. No. 3,826,737, Pegels et al., issued July 30, 1974, discloses a continuous process and apparatus for catalytically treating residual oils. The process is disclosed as operating on a feed having a total metals content of less than 65 ppm by weight. The demetallation reactor disclosed is stated to be suitable either for countercurrent or cocurrent operation, although the patent is directed primarily to cocurrent operation. U.S. Pat. No. 3,882,015, Carson, issued May 6, 1975, discloses a unitary multiple-stage reaction system for countercurrently contacting a fluid reactant stream with catalyst particles, primarily for reactions involving light naphtha hydrocarbons.

As noted above, most process schemes relating to desulfurizing and demetallizing heavily contaminated feedstocks, if they do not relate to fixed bed operation, relate to cocurrent moving bed operation. In such operation the feed and the catalyst both flow through the reactor in the same direction. Examples of these schemes include: U.S. Pat. No. 3,730,880, Van der Toorn, et al., issued May 1, 1973—residual oil desulfurization in a cocurrent intermittent moving bed; U.S. Pat. No. 3,880,598, Van der Toorn, et al., issued Apr. 29, 1975—residual oil hydrodesulfurization in an intermittent cocurrent moving bed operation; U.S. Pat. No. 4,312,741 Jacquin, issued Jan. 26, 1982—conversion of hydrocarbons or bituminous shale in the liquid phase in semi-stationary or ebullating beds with intermittent countercurrent catalyst flow.

Fixed bed and cocurrent moving beds are easier to design than countercurrent moving beds. The ease of operation of cocurrent as opposed to countercurrent moving beds is discussed in the literature, which discloses a large number of reaction schemes, apparatus, and processes for adding and removing catalysts and reactants in these processes. Some examples of these disclosures include: U.S. Pat. No. 2,956,010, Buckner, issued Oct. 11, 1960—method and apparatus for the supply of reactant and contact material to moving masses of granular contact materials; U.S. Pat. No. 3,336,217, Meaux, issued Aug. 15, 1967—method and apparatus for intermittently withdrawing particulate catalysts from the bed of a high pressure and temperature reactor; U.S. Pat. No. 3,547,809, Ehrlich, et al., issued Dec. 15, 1970—a process for the addition and withdrawal of solids from a high pressure reaction vessel by using a pressurized liquid transfer medium; U.S. Pat. No. 3,785,963, Boyd, et al., issued Jan. 15, 1974—withdrawing uniform amounts of solids from a movable bed of solids by a system comprising a plurality of conduits equally spaced across the solids cross-sectional area; U.S Pat. No. 3,849,295, Addison, issued Nov. 19, 1974—removal of catalysts from moving bed reactor systems having poor catalyst flow due to liquid reactants or catalyst agglomeration problems; U.S. Pat. No. 3,856,662, Greenwood, issued Dec. 24, 1974—solids withdrawal and transport vessels and methods for use in superatmospheric pressure systems; U.S. Pat. No. 4,188,283, Czajkowski, et al., issued Feb. 12, 1980—start up method for moving bed reactors used in hydrogenating olefin-containing hydrocarbons.

U.S. Pat. No. 3,910,834, Anderson, issued Oct. 7, 1975, discloses a process in which a solids-containing feed, derived from oil shale or tar sands, is passed countercurrently or cocurrently through a moving bed reactor in a dual function system which simultaneously filters out the solids and hydroprocesses the feed. Catalyst is moved through the reactor by maintaining a desired pressure drop in the catalyst bed and a desired solids filtraton rate. Countercurrent flow of the synthetic, solids-containing feed and the catalyst is disclosed as a preferred mode of operation. The patent teaches that countercurrent flow prevents escape of filtered particulate matter when the catalyst bed moves.

Other reaction schemes for demetallation processes include the use of ebullating or fluidized beds. In an ebullating bed, a liquid or gaseous material flows upwardly through a vessel containing a mass of solid particles. The solid particle mass is maintained in random motion by the upflowing streams and the physical space occupied by the catalyst bed is larger ("expanded") as compared either to the space occupied by the catalyst bed when no material flows through it or to a fixed- or a moving bed-type reaction zone. Discussions of ebullating bed reaction zones and their characteristics can be found in Re. No. 25,770 of U.S. Pat. No. 2,987,465, Johanson, issued June 6, 1961, as well as in U.S. Pat. No. 3,901,792, Wolk, et al., issued Aug. 26, 1975—demetallizing and desulferizing crude or atmospheric residual oils using an ebullating bed, and, in U.S. Pat. No. 4,217,206, Nongbri, issued Aug. 12, 1980 catalytically demetallizing Venezuelian crude oils using fixed and preferably ebullating beds.

The non-patent literature also discusses upgrading heavy, contaminated oils. For example, LC-Fining, as described in "Hydrocarbon Processing", pg. 107, May 1979, involves the use of an ebullating bed reactor. The ebullating or expanded bed design is disclosed as allowing very heavy feedstocks to be processed without shutting down the unit for catalyst replacement. The H-OIL Process as described in "Hydrocarbon Processing", pg. 112, September 1980, uses an ebullating bed with on-stream catalyst addition and withdrawal to upgrade high metals and high sulfur content feeds. The Shell-Bunker Flow Process as described in the Oil and Gas Journal, pg. 120, Dec. 1, 1980, involves an intermittent cocurrent flow as described in the Pegels and Van der Toorn patents discussed above.

Although countercurrent moving beds are known to be useful for demetallation and desulfurization reactions, the problems of countercurrent flow of catalyst to the liquid and gas, particularly hydrogen, as opposed to cocurrent or even fixed bed operation have not been solved so that practical operation was possible. By employing the process of the present invention, such a countercurrent slowly moving bed of catalyst may be utilized with improved contact of gas and liquid and at the same time progressive improvement in the contact quality of both the fresh or regenerated catalyst with the lighter components is achieved. Further, a greater portion of contaminants are removed with the spent catalyst.

In downflow reactors, if the liquid feed contains solids, the solids tend to pack and form obstructions. The problem is further aggravated if the feed stream is comprised of gases as well as solids and liquids. Accordingly, upflow reactors are commonly employed in coal liquefaction systems such as the liquefaction process disclosed in U.S. Pat. No. 4,083,769, Hildebrand, et al., issued Apr. 8, 1978. As there taught, hydrogen, ground coal and solvent are preheated and passed to a dissolver wherein the coal is substantially dissolved at a temperature in the range 750°–900° F. (379°–482° C.) and at a pressure in the range 3100-5000 psi (217 kg/cm$^2$-350 kg/cm$^2$). The dissolver is an empty upflow reactor vessel which provides sufficient residence time for the dissolution of the ground coal particled to occur. Solvent, dissolved coal, coal residue and hydrogen from the dissolver are then passed to an upflow catalytic hydrogenation reactor operating at a lower temperature, say 25°–150° F. (13.9°–83.3° C.), than the dissolver.

Since the hydrogen is mixed with the coal slurry prior to the preheating step to avoid coking in the heater, little or no control is exerted over the degree of liquid and gas mixing which occurs in the dissolver or catalytic reactor. With multiphase flow, gas channeling and/or slugging in these units may occur. The presence of either condition is undesirable since both result in inadequate contacting of the reactants and the slugging may also create damaging equipment vibrations. If channeling results from inadequate mixing of the gas, especially hydrogen, coking of either catalyst or reactant, or both, and equipment fouling can result. Such channeling or slugging may be further amplified by downward movement of the catalyst bed, induced by funneling and removal of catalyst from the bed.

Thus, it is apparent that a need exists for a feed distributor which will accept streams comprising liquids, gases and solids and evenly distribute the phases without plugging or producing undue erosion during continuous countercurrent movement of both feed and catalyst.

Mixed phase distributors are known in the art, such as those disclosed in U.S. Pat. Nos. 3,524,731; 4,111,663; 3,146,189; 3,195,987 and 4,187,169, for fixed beds. Copending application Ser. No. 278,789, filed June 29, 1981, assigned to the assignee of the present application, also discloses an upflow feed stream having a distribution system arranged to feed liquids, solids, and gases through a relatively fixed bed of catalyst. It does not disclose a method of removing catalyst from the vessel or use of the distributor as a support bin for a moving catalyst bed and to aid removal of catalyst particles from the bed.

SUMMARY OF THE INVENTION

The present invention provides an improved method of contacting a gas-liquid or gas-liquid-solid hydrocarbon feed with a downwardly flowing bed of fresh or regenerated catalyst particles in a reaction vessel. Such improved contact is achieved by forming a gas pocket below the catalyst bed and above the liquid supply in the reactor so that the gaseous components of the feed separately flow upwardly into the bed. The gas pocket is formed in a lower portion of the vessel by a substantially inclined feed distribution surface, preferably in the form of a cone. The conical distributor includes a plurality of gas flow holes through the distribution surface and located at different elevations. At least one but preferably a plurality of liquid or liquid-solid feed tubes extend in open communication between a liquid volume in the reactor vessel below the gas pocket and the catalyst bed reactor vessel volume above the inclined surface. The cross-sectional area of each of the gas flow holes at such elevations and of the tube for liquid flow through the catalyst and reactants is proportioned to establish and maintain uniform feed conditions into and across the full area of the reactor bed. Further, such pressure control forms the desired gas pocket below the inclined surface. The height of such gas pocket is desirably maintained less than, or equal to, the length of the liquid-solid flow tubes so that substantially all of the gaseous components evolving from the feed pass through the holes at substantially uniform rates irrespective of their elevation and substantially all of the liquid or liquid-solid components pass upwardly through the tubes to contact the downwardly flowing catalyst.

Desirably, the conical surface is disposed so that the apex extends downwardly relative to said feed. Also, desirably the feed is transversely deflected as it enters the reaction vessel to prevent direct vertical passage of gas bubbles evolving out of the feed from entering the liquid-solid feed tubes. If desired, to maintain equilibrium of feed flow, additional gas may be independently introduced into the gas pocket.

Preferably, catalyst is removed from the vessel through at least one line extending upwardly from a lower portion of the vessel through the conical plate and terminating adjacent the conical apex. In this way, the spent catalyst can be continuously or periodically withdrawn from the moving catalyst bed without substantial upset of equilibrium feed conditions which establish the gas pocket. In one form, the catalyst withdrawal tube terminates at a level below any of the gas holes in the inclined surface.

Viewed in another aspect, the invention is directed to a method of upgrading a hydrocarbon stream containing metallic components and/or inert materials which are contaminants for reaction or contact with catalyst particles. It includes passing the hydrocarbon stream upwardly into the lower portion of a reaction vessel at temperature and pressure conditions which permit gaseous components to evolve from the stream to thereby form a common liquid supply and a gaseous supply volumes below a bed of descending catalyst particles. The catalyst particles counterflow downwardly through an upwardly flowing stream from both the liquid and gaseous volumes of gaseous, liquid and/or solid hydrocarbonaceous materials containing such metallic components and/or inert materials. Such volumes are formed between the lower end of the reaction vessel, (or below a bed of catalyst in a multibed reactor) and a conical support member for the descending bed of catalyst particles. A plurality of holes are formed at different elevations in the conical support and at least one of the holes is connected to a tube extending through the gaseous supply volume in the common volume down into said liquid supply. In this way the liquid or liquid-solid portion of the feed is in open fluid communication with the bed of catalyst particles supported on the inclined surface. The remaining holes in the conical support provide gaseous flow passages into the catalyst particles. Each of the other holes is dimensioned with respect to the liquid flow area of the one or more tubes and the other passageways so that uniform dispersion of both the gaseous components and the liquid hydrocarbonaceous components is maintained into the descending bed of catalyst particles.

In a particularly important application of the present invention, catalyst is continuously added at the top of the reactor to the slowly moving bed and spent catalyst, is continuously withdrawn. The deactivated catalyst is removed from the reactor after it has been deactivated to a substantially lower level of activity than an acceptable minimum average level of activity of the overall catalyst bed. This allows more efficient and complete use of the catalyst activity, e.g., its metals capacity, for such feed upgrading functions as demetallation.

By "moving bed", as used herein is meant, a reaction zone configuration in which a catalyst is added at one end of a catalyst bed in an intermittent or substantially continuous manner and is withdrawn at the other end in an intermittent or substantially continuous manner. Preferably, catalyst is added at the top of the reaction zone and withdrawn at the bottom. As the term is used herein, a "moving bed" is not the same as a "fluidized bed", "ebullating bed" or expanded bed". In fluidized beds, the flow rate of fluids, relative to the particles of the catalyst, is fast enough so that the catalyst behaves like a fluid, with particles circulating throughout the bed or even being carried out of the bed with the products. Ebullating or expanded beds are very similar to fluidized beds, except that the relative rate of flow of the fluids is not quite as great and the extent of catalyst movement within the reaction zone is not quite as great. The typical ebullating bed reactor will have a mass of solid particles whose gross volume in the reaction vessel is at least 10 percent larger when feed is flowing through it, as compared to the stationary mass with no feed flowing through it. Although the particles in the bed do not necessarily circulate as if they were fluids, they are separated from one another and go through random motion.

In the type of moving bed to which the present process is directed, the catalyst particles in the bed are substantially in contact with one another. The catalyst bed is not significantly expanded when the fluid or feed passes through it. It has essentially the character of a fixed bed except for the addition and removal of catalyst. In a larger reactor, less catalyst will have to be added during operation, but the capital costs of the reaction vessel will be much larger. On the other hand, in a small reactor, more catalyst will have to be replaced during operation but the capital cost of the reactor will be much lower. Among the other factors which must be balanced are the demetallation capacity of the catalyst used, the metal content of the feed introduced into the reaction zone and the extent of demetallation desired.

Intermittent or continuous catalyst addition and withdrawal may be used. Catalyst replacement rates can range from several percent of the charge per day to several percent of the charge per week, depending on the reactor size, catalyst metals capacity, feed rate and feed composition.

Undesirable metals which are often present in hydrocarbonaceous feeds notably include nickel, vanadium, arsenic, and iron. These metals deactivate conventional, fixed bed catalysts such as hydroprocessing catalysts and also rapidly and irreversibly deactivate FCC catalysts when high metals level feed are charged directly to conventional units. These metals are often present as organo-metallic compounds. Thus, the use of the terminology "iron, nickel, arsenic or vanadium compounds" means, those metals in any state in which they may be present in the feed to the process of the invention, either as metal particles, inorganic metal compounds, or as organo-metallic compounds. Where amounts of metals are referred to herein, the amounts are given by weight based on the metal itself.

For maximum efficiency in such a countercurrent demetallation process, the feed should have levels of the undesirable metals greater than about 150 ppm by weight of the feed, preferably greater than about 200 ppm by weight of the feed and more preferably greater than about 400 ppm by weight.

Although nickel, vanadium, arsenic, and iron are the most usual metal contaminants, other undesired metals, such as sodium and calcium, can also contribute to the metals content of the feed for purposes of demetallation processing.

The feed for the present process is a heavy hydrocarbonaceous oil. By "heavy" feed, as used herein, is meant a feed at least 50 volume percent of which boils above 204° C. Preferred feeds are residual fractions and synthetic crudes. They can be derived from crude petroleum, from coal, from oil shale, from tar sand bitumen, from heavy tar oils, and from other synthetic sources. The present process is advantageously employed to refine highly refractory and contaminated feeds. These feeds are high boiling range materials. They preferably contain a substantial fraction boiling above 343° C. and particularly preferably above about 510° C. The feed may be substantially free from finely divided solids such as shale fines, sand or the like. The feed may contain a substantial concentration (e.g., 1 weight percent or more) of finely divided solids. At such temperatures, proper mixing and feed of evolving gas to the countercurrent flow stream is particularly assisted by the separate gas and liquid feed through the distributor system of the present invention.

In carrying out the process of the present invention, a minimum average level of catalytic feed upgrading activity for the countercurrently moving catalyst bed as a whole is selected for the particular catalytic upgrading reaction. For a moving bed in a demetallation reaction system, for example, the minimum average upgrading activity level for the catalyst bed is one which removes the necessary amount of metals from the feed when it passes through the moving bed at demetallation conditions. Similarly, for a desulfurization reaction system, the catalyst bed removes the necessary amount of sulfur from the feed when it passes through the moving bed at desulfurization conditions. Thus, as will be apparent to those skilled in the art, the minimum average upgrading activity level for a particular reaction system will depend on the desired degree of a contaminant, such as metals, sulfur, nitrogen, asphaltenes, etc., which the refiner desires to remove from the heavy oil feed. The degree of, e.g., demetallation, will typically be set by economics and the downstream processing that the heavy feed will undergo.

Further, according to the invention, the actual average level of catalytic upgrading activity for the catalyst bed as a whole is measured. Measurement of the actual average level of upgrading activity is made by determining the extent to which the feed stream is being upgraded in the countercurrent moving bed system. For example, when upgrading involves demetallation, demetallation activity is measured by a determination of the residual concentration of metals remaining in the effluent stream from the moving bed system. When upgrading involves desulfurization, desulfurization activity is, analogously, measured by a determination of the residual concentration of sulfur remaining in the effluent from the reaction system. Overall bed upgrading activity for other upgrading reactions is measured in a similar manner by determining the residual amount of the contaminant which is to be removed by the process.

Fresh catalyst is introduced into the downstream end of the catalyst bed, and a corresponding volume of deactivated catalyst is removed from the upstream end of the catalyst bed, at a rate which is sufficient to maintain the actual overall average level of catalytic upgrading activity of the bed as a whole at or above the selected minimum average activity level. By "upstream" end of the catalyst bed, as used herein, is meant the end of the moving bed into which the heavy hydrocarbonaceous feed is introduced. By "downstream" end of the catalyst bed is meant the end of the bed from which the process effluent is recovered. In a normal gravity flow system, the catalyst is added and effluent removed at the top of the vessel (the downstream end). Spent catalyst is removed and feed introduced at the bottom (the upstream end).

By use of the present process the catalyst may be used until it is extremely inactive. For example, in demetallation as much as 90 percent of the total metals capacity of the catalyst can be used before the deactivated catalyst is removed from the bed. Simultaneously, the average upgrading activity of the bed as a whole is maintained at a desirably high level by the presence of relatively fresh catalyst in the downstream portion of the bed. In contrast to fixed bed processes, catalyst can be utilized so efficiently that catalyst removed from the reactor may have an average activity substantially below the lowest acceptable overall activity for the bed as a whole. In a fixed bed system, on the other hand, once the actual average level of activity for all the catalyst in the fixed bed reaches the minimum acceptable average activity, the whole process must be shut down and the whole catalyst bed replaced. Thus, much of the metals capacity or other activity of the fixed bed catalyst can go unutilized.

Higher feed hourly space velocities using countercurrent process are more efficient than cocurrent moving bed processing. It will be readily appreciated that the faster a feed can be passed through the catalyst bed, the smaller and less expensive the reactor can be. The feed hourly space velocity for the present process is greater than about 0.5, and preferably greater than about 1.0.

A preferred upgrading use of the present invention is for feed demetallation. For such upgrading, the temperatures and pressures within the reaction zone can be those typical for conventional demetallation processing. The pressure is typically above 300 psig (314.7 psia; 21.8 bar), preferably above about 500 psig (514.7 psia; 35.5 bar). The temperature is typically greater than about 315° C., and preferably above 371° C. Generally, the higher the temperature, the faster the metals are removed; but the higher the temperature, the less efficiently the metals capacity of the demetallation catalyst is used. While demetallation reaction can be conducted in the absence of added hydrogen, hydrogen is generally used and therefore requires full and equal distribution into the moving bed along with any gases evolving from the feed.

Catalysts which can be used in the countercurrent upgrading reaction zone for carrying out demetallation are those which are typically used for demetallation reactions. The preferred materials usually have high-average pore diameters. Examples of demetallation catalysts are disclosed in U.S. Pat. No. 3,947,347, Mitchell, issued March 30, 1976; U.S. Pat. No. 4,119,531, Hopkins, et al., issued Oct. 10, 1978; U.S. Pat. No. 4,192,736, Kluksdahl, issued March 11, 1980; and U.S. Pat. No. 4,227,995, Sze, et al., issued Oct. 14, 1980. These patents, which are incorporated by reference herein, and other U.S. Pat. Nos. which also disclose acceptable demetallation catalysts can be found in Class 208, Subclass 251.

The catalysts particularly useful in carrying out demetallation have a high metals capacity. The metals capacity of the catalyst is preferably greater than about 0.10 grams of metal per cubic centimeter of catalyst and is more preferably greater than about 0.20 grams metal per cubic centimeter of catalyst. The advantages of countercurrent operation over a cocurrent moving bed system are greater if the metals capacity can also contain a hydrogenation component. Conventional hydrogenation components are Group VIB or VIII metal compounds, especially compounds of nickel, cobalt, molybdenum and tungsten.

The product from the present process is normally subjected to further conventional refinery processing. All or part of the product can be passed to a conventional, fixed bed upgrading operation, such as a hydrodesulfurization operation. Part of the product stream can be recycled, either for further catalytic treatment or as a diluent. Treatment of heavy feeds by catalytic demetallation according to the present process followed by fixed bed desulfurization is particularly effective, but all or part of a demetallized product from the countercurrent demetallation reaction zone can also be processed in a countercurrent moving bed desulfurization reaction zone.

Catalytic upgrading conditions such as catalytic desulfurization conditions, catalytic hydrogenation conditions (e.g., designed for asphaltenes saturation), catalytic denitrogenation conditions and catalytic hydrocracking conditions employed in embodiments of the present process all include a reaction temperature in the range from about 230° C. to about 480° C., a pressure in the range from about 30 to about 300 atmospheres, a hydrogen rate of about 1000 to about 25,000 standard cubic feet per barrel of feed, and a liquid hourly space velocity in the range from about 0.20 to about 10.

Desulfurization catalysts, hydrogenation catalysts, denitrogenation catalysts and hydrocracking catalysts employed in embodiments of the present process may be conventional catalysts well known to those skilled in the art. In general, the hydrogenation catalysts are chosen to have little cracking activity, while hydrocracking catalysts are chosen to have relatively high cracking activity. Hydrogenation activity is typically obtained by use of Group VI and/or Group VIII metals. Acidic cracking activity is typically supplied by use of an acidic, refractory inorganic oxide such as a zeolitic or amorphous aluminosilicate.

Further objects and advantages of the present invention will become apparent from the following detailed description of the preferred embodiments, taken in conjunction with the accompanying drawings which form an integral part of the present specification.

DESCRIPTION OF THE PREFERRED EMBODIMENTS

Figure 1:
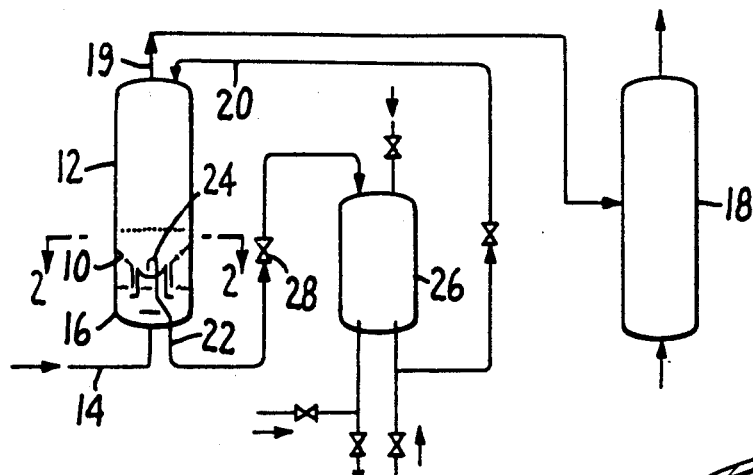
FIG. 1 is a schematic diagram of a hydrocarbon processing system in which the present invention finds particular utility. It particularly illustrates both the reaction vessel and the catalyst withdrawal and regeneration system for continuous withdrawal and replacement of catalyst in conjunction with a moving bed catalyst system employing a gas and liquid or liquid-solid distributor.

FIG. 1 shows in schematic form a flow diagram for a system for reacting a gas-liquid or gas-liquid-solid feed with a slowly moving body of catalyst particles. The present invention is particularly directed to the distribution of gas components in such gas-liquid or gas-liquid-solid feed. To this end distributor 10 in vessel 12 is formed in the shape of an inclined surface or a cone so that it forms both a gas-liquid distributor and a mass flow bin for catalyst flowing downwardly in vessel 12.

Figure 3:
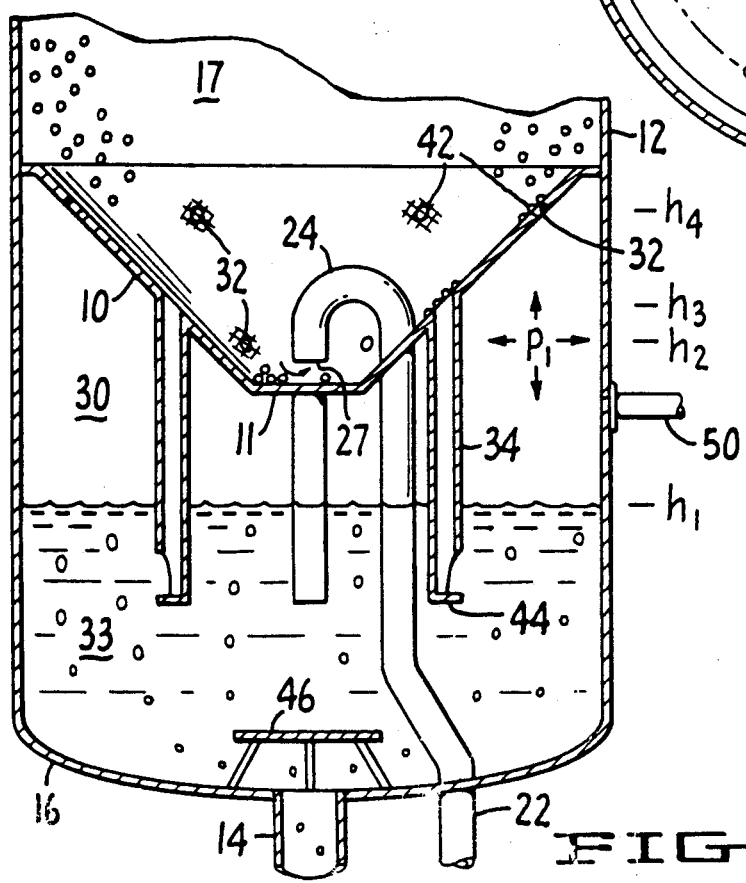
FIG. 3 is an elevational cross-section view of the lower portion of the vessel 12 shown in FIGS. 1 and 2 taken in the direction of arrows 3—3 in FIG. 2.

In the arrangement of FIG. 1 the feed inlet is through line 14 at lower end 16 of vessel 12. Product or effluent leaves vessel 12 by line 19 and is carried overhead to a distillation column, generally illustrated as 18. Fresh or regenerated catalyst particles are supplied to the vessel through a return line 20. Flow of catalyst through vessel 12 is under the control of withdrawal or removal line 22 which extends inwardly through conical distributor 10 to withdrawal nozzle 24, formed in the shape of an inverted U-tube. As best seen in FIG. 3, the preferred location of inlet tube 24 is adjacent truncated apex 11 of the cone formed by distributor 10. Withdrawal through tube 24 is either continuous or controlled to return catalyst after contamination or deactivation by interaction with the feed in reactor 12 to regenerator vessel 26 through control valve 28 in line 22. A description of a suitable system for catalyst withdrawal and return to the reaction vessel is particularly described in copending application Ser. No. 537,023 filed Sept. 29, 1983 now abandoned, assigned to the assignee of the present invention. As disclosed in that application, the flow of catalyst from the reactor to the regenerator is through liquid pressure control of process fluid to create flow of catalyst from a reactor to a regenerator using flow in an external fluid stream, such as hydrogen. Other compatible fluid streams, including hydrocarbon liquids may also be used, if desirable.

In accordance with the present embodiment of the invention, the combined feed of gas-liquid or gas-liquid-solid is admitted to vessel 12 under pressure and temperature conditions which result in gas evolution from the feed as it contacts the slowly moving bed of catalyst.

Figure 2:
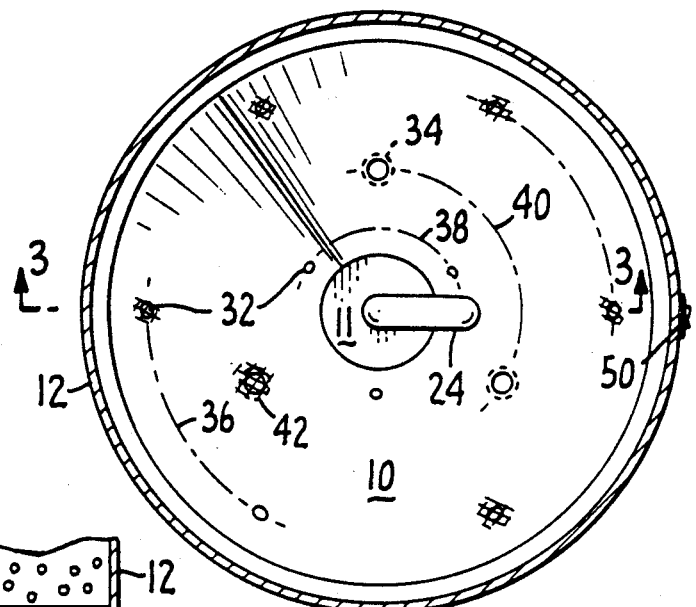
FIG. 2 is a plan view taken in the direction of arrows 2—2 in FIG. 1, showing a cross-section through a portion of the reactor vessel 12 and particularly illustrates the distribution of entry pipes and holes through the inclined distributor plate to achieve uniform gas distribution into the moving catalyst bed.

As noted above, the moving bed is substantially in catalyst particle to catalyst particle contact so that gas distribution into the bed is a problem of assuring relatively even dispersion of the gas phase throughout the bed of catalyst and the reacting liquids over the entire cross-section of the vessel. With the catalyst continually moving through the vessel, such uniform dispersion of the gaseous components is essential to maintain activity of the catalyst and gas to react with the heavy liquids and solids of the feed. As particularly illustrated in FIGS. 2 and 3, cone 10 includes a plurality of gas distribution holes 32 formed at different elevations in the cone and in direct communication with a gas reservoir or pocket 30 developed below the undersurface of cone 10 by pressure and flow conditions in vessel 12. Gas pocket 30 in the present embodiment is formed at the lower end 16 of vessel 12 as a part of a common feed chamber for liquid or liquid-solid and gas evolving from such liquids. Although the gas pressure in pocket 30 will be substantially the same throughout its volume, flow characteristics of such gas into the catalyst bed is different at the different elevations of holes 32 due to density effect of the catalyst and liquid head at such different elevations. In FIG. 3 the relative elevation of the liquid and gas are indicated as heights $h_1$, $h_2$, $h_3$ and $h_4$. The base elevation of the top of liquid reservoir 33 is indicated as $h_1$. Additionally, such flow is affected by the area of tubes 34 rising from liquid volume 33 to introduce the liquid or liquid-solid components into the lower portion of catalyst bed 17. In the present embodiment a plurality of such tubes 34, for example 4, are in open communication between liquid or liquid-solid volume and bed 17. Height $h_1$ is maintained by regulating the pressure and flow conditions of gas entering reactor 12 and the rate of liquid flow into the catalyst bed through tubes 34. As also indicated in FIG. 2, the size of holes 32 is determined in accordance with their elevation above level $h_1$ and the density of the liquid. As shown, holes 32 on circle 36 at level $h_4$ are larger in area than those at $h_2$ on circle 38. The level of the entry tubes 34 is indicated as being on circle 40 at level $h_3$. It will, of course, be understood that flow of fluids into the bed will be determined, not only by the areas of these holes, but also by their number and distribution on surface 10. As also shown in FIGS. 2 and 3, each of the holes is preferably covered with a screen 42 to prevent catalyst particles from passing downwardly through the openings.

By proper proportioning of holes 32 it is possible to obtain substantially uniform gas flow into the downflowing catalyst across the full cross-section of vessel 12. At the same time liquid is distributed by tubes 34 from chamber 32.

It is also to be particularly noted that gas is prevented from flowing directly upward through tubes 34 by deflectors 44 at the end of each tube 34. Further, gas evolution from feed entering through line 14 is assisted by positioning deflector plate 46 to overlie inlet line 14 to divert flow laterally. This assists in slowing the fluid to release gas from the stream. It also prevents the gas from rising directly into bed 17 from the line 14.

Additional gas, such as hydrogen, may be supplied to gas pocket 30, as by external line 50 in FIG. 3. Such supplemental gas may be added to the system so that gas pocket 30 may be initially established to a desired level. For this purpose, it will be understood that the number and size of holes 32 must be such that pressure $P_1$ can be established and maintained as the input pressure to each such hole. As shown, the height of pocket 30 is less than or equal to the length of tubes 34, but the entry level $h_3$ of such tubes is sufficiently above apex 11 of cone 10 to provide adequate withdrawal volume for catalyst funneled to withdrawal nozzle 27 of tube 24. Desirably, apex 11 of cone 10 is also below the lowest holes 32, as at level $h_2$ in conical plate 10. This assures that when catalyst is withdrawn from the bed gas flow into the catalyst is not upset by such catalyst removal. While in general a conical form of distributor 10 is preferred, any suitably inclined surface that will produce a hopper bottom may be used. The primary limit on the angle of inclination of distributor 10 is one at which it exceeds the angle of internal resistance (also called "angle of recline") for gravity flow of the catalyst particles.

From the foregoing description, it will be seen that the present arrangement makes possible feeding a relatively heavy crude including inert materials, such as tar sands, coal, and shale into liquid contact with catalyst particles moving substantially continuously downwardly in vessel 12. At the same time gas, such as hydrogen, may be included in the feed and the combined components heated to pressures and temperatures required for catalytic separation of hydrocarbons from metal and inert components, while assuring even or selected distribution of the gaseous components evolving from the liquid or liquid-solid feed in volume 33. Although, in general equal distribution across the full cross-section area of vessel 12 is desired, the plurality of holes 32 formed in distributor plate 10 may be proportioned to create other flow patterns into reaction volume 17 of vessel 12. Such distribution is assured by correct proportioning of these holes in accordance with their height on the vertical surface of conical plate 10 relative to the liquid-catalyst head.

Various modifications and changes in both the apparatus and the method of operating such apparatus to perform the methods of the present invention will occur to those skilled in the art from the above detailed description of the preferred embodiments. All such modifications or changes coming within the scope of the appended claims are intended to be included therein.

I claim:

1. A method of upgrading a hydrocarbon feedstream containing organo-metallic and/or metal components under catalytic hydrocarbon upgrading conditions in a reactor vessel wherein an upwardly flowing feed stream reacts with a downwardly moving catalyst bed, said vessel including feed inlet means at the lower end thereof and product recovery means and catalyst delivery means at the upper end thereof, which comprises:

introducing said hydrocarbon feed containing organo-metallic and/or metal components as an upwardly flowing stream into a reaction vessel having a downwardly moving bed of catalyst particles therein to form a fluid reservoir zone in said vessel below the catalyst bed, said catalyst bed terminating at its lower end in a closed conical catalyst zone having its apex extending downwardly toward said reservoir zone, controlling the pressure and temperature of said reservoir zone to permit evolution of gas components from fluids therein so as to form a gas supply zone below said conical catalyst zone and above a separate liquid supply zone;

passing said gas components upwardly through a multiplicity of circumferential spaced apart, discrete passage for direct communication of said gas components from said gas supply zone into said conical catalyst zone at a plurality of different elevations above said apex, and passing the liquid components to said conical catalyst zone through a plurality of circumferentially spaced apart, impervious liquid passageways each of said liquid passageways extending through said gas supply zone into one of a plurality of liquid passages opening into said conical catalyst zone, said plurality of liquid passages being circumferentially spaced apart and at a plurality of different elevations above said apex, each of said liquid flow passageways having an area proportioned to a plurality of said gas passages to control the diffusion pattern of said gas components and said liquid components into said bed of catalyst particles descending through said vessel, and all of said liquid passages entering said conical catalyst bed sufficiently above its apex to form a quiescent particles withdrawal zone adjacent said apex, and removing catalyst particles from said conical catalyst zone through at least one flow line extending upwardly from the lower portion of said vessel, said flow line having its intake directed generally downwardly and within said quiescent particle withdrawal zone to permit periodic removal of portions of said moving catalyst bed without interference with flow of gas or liquid components into said conical catalyst zone and without substantial upset of the pressure equilibrium condition between said liquid supply zone and said gas supply zone within said vessel relative to said conical catalyst zone.

2. The method in accordance with claim 1 wherein said hydrocarbon feed stream includes hydrogen as a gas component mixed therein.

3. The method in accordance with claim 2 which includes directly adding hydrogen gas to said gas supply zone to control the pressure and volume of said gas supply zone.

4. The method in accordance with claim 1 wherein the area of each of said liquid passageways is proportioned to the total area of a plurality of adjacent gas passages at substantially the same elevation above said apex of said conical catalyst zone.

* * * * *